United States Patent
Chiao et al.

(10) Patent No.: US 12,493,210 B2
(45) Date of Patent: Dec. 9, 2025

(54) DISPLAY PANEL

(71) Applicant: HannStar Display Corporation, Taipei (TW)

(72) Inventors: Yu-Chi Chiao, Taipei (TW); Chung Lin Chang, Taipei (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/882,773

(22) Filed: Sep. 12, 2024

(65) Prior Publication Data

US 2025/0264755 A1 Aug. 21, 2025

Related U.S. Application Data

(60) Provisional application No. 63/555,105, filed on Feb. 19, 2024.

(30) Foreign Application Priority Data

May 27, 2024 (TW) ................................. 113119463

(51) Int. Cl.
*G02F 1/1335* (2006.01)

(52) U.S. Cl.
CPC .. *G02F 1/133553* (2013.01); *G02F 1/133565* (2021.01)

(58) Field of Classification Search
CPC ...................... G02F 1/133553; G02F 1/133565
USPC ......................................................... 349/113
See application file for complete search history.

(56) References Cited

U.S. PATENT DOCUMENTS

| 2007/0070273 | A1 | 3/2007 | Yoshida et al. |
| 2009/0066895 | A1* | 3/2009 | Kuo ................... G02F 1/133371 349/114 |
| 2010/0045917 | A1 | 2/2010 | Imai et al. |
| 2010/0157213 | A1* | 6/2010 | Kubo ................ G02F 1/133707 349/114 |
| 2016/0299603 | A1* | 10/2016 | Tsujioka ............... G06F 3/0443 |

FOREIGN PATENT DOCUMENTS

| CN | 100437261 | 11/2008 |
| CN | 105607334 | 5/2016 |
| CN | 117031807 | 11/2023 |
| JP | 2001108818 | 4/2001 |
| JP | 2003075853 | 3/2003 |
| JP | 4363339 | 11/2009 |
| TW | 201632960 | 9/2016 |

OTHER PUBLICATIONS

"Office Action of Taiwan Counterpart Application", issued on Feb. 27, 2025, p. 1-p. 7.
"Search Report of Europe Counterpart Application", issued on Mar. 26, 2025, p. 1-p. 14.

* cited by examiner

*Primary Examiner* — Christopher M Raabe
(74) *Attorney, Agent, or Firm* — JCIPRNET (57) ABSTRACT

A display panel including a first substrate, a second substrate, a plurality of pixel structures and a liquid crystal layer is provided. The first substrate and the second substrate are overlapped with each other. The pixel structures are disposed on the first substrate and respectively provided with a plurality of reflective patterns. Each of the reflective patterns is divided into a plurality of reflective portions by a plurality of micro-slits. The reflective portions are connected to each other. The liquid crystal layer is disposed between the first substrate and the second substrate.

13 Claims, 12 Drawing Sheets

DISPLAY PANEL

CROSS-REFERENCE TO RELATED APPLICATION

This application claims the priority benefit of U.S. provisional application Ser. No. 63/555,105, filed on Feb. 19, 2024 and Taiwan application serial no. 113119463, filed on May 27, 2024. The entirety of each of the above-mentioned patent applications is hereby incorporated by reference herein and made a part of this specification.

BACKGROUND

Technical Field

The disclosure relates to a display technology, and more particularly, to a display panel.

Description of Related Art

Since the reflective display panel uses a reflective layer to reflect ambient light, it may have the advantage of low energy consumption in operation. In order to increase the reflection efficiency, the reflective layer is generally made of a metal material with high reflectivity, and its distribution range in the display pixel area is increased as much as possible. However, this approach also makes it easier to highlight the light leakage problem due to manufacturing process factors when reflective display panels operated in a dark-state mode, resulting in poor display contrast.

SUMMARY

The disclosure provides a display panel with better dark-state performance and better display contrast.

A display panel in the disclosure includes a first substrate, a second substrate, a plurality of pixel structures and a liquid crystal layer. The first substrate and the second substrate are overlapped with each other. The pixel structures are disposed on the first substrate and respectively provided with a plurality of reflective patterns. Each of the reflective patterns is divided into a plurality of reflective portions by a plurality of micro-slits. The reflective portions are connected to each other. The liquid crystal layer is disposed between the first substrate and the second substrate.

In an embodiment of the disclosure, the reflective patterns are respectively arranged at intervals along a first direction and a second direction. The first direction intersects the second direction. Each of the reflective patterns has a first side edge and a second side edge arranged along the first direction. The micro-slits include a plurality of first micro-slits whose extension direction is parallel to the first direction. The first micro-slits extend from the first side edge.

In an embodiment of the disclosure, each of the reflective patterns further has a third side edge and a fourth side edge arranged along the second direction. The first micro-slits are arranged at intervals along the second direction and disposed between the third side edge and the fourth side edge.

In an embodiment of the disclosure, the micro-slits further include a plurality of second micro-slits extending from the second side edge. An extension direction of the second micro-slits is parallel to the first direction. The second micro-slits are arranged at intervals along the second direction and disposed between the third side edge and the fourth side edge. The second micro-slits are respectively aligned with the first micro-slits along the first direction.

In an embodiment of the disclosure, the micro-slits further include a plurality of third micro-slits extending from the first side edge. An extension direction of each of the third micro-slits intersects the first direction and the second direction.

In an embodiment of the disclosure, the micro-slits further include a plurality of fourth micro-slits extending from the second side edge. An extension direction of each of the fourth micro-slits intersects the first direction and the second direction.

In an embodiment of the disclosure, an included angle between the extension direction of each of the third micro-slits and the first side edge is 45 degrees. An included angle between the extension direction of each of the fourth micro-slits and the second side edge is 45 degrees.

In an embodiment of the disclosure, a first one and a second one of the third micro-slits are provided between any two adjacent ones of the first micro-slits, the third side edge and the fourth side edge. The extension direction of the first one of the third micro-slits intersects the extension direction of the second one of the third micro-slits.

In an embodiment of the disclosure, a first one and a second one of the fourth micro-slits are provided between any two adjacent ones of the second micro-slits, the third side edge and the fourth side edge. The extension direction of the first one of the fourth micro-slits intersects the extension direction of the second one of the fourth micro-slits.

In an embodiment of the disclosure, the first micro-slits and the third micro-slits are alternately arranged along the second direction. The second micro-slits and the fourth micro-slits are alternately arranged along the second direction.

In an embodiment of the disclosure, the micro-slits further include a plurality of third micro-slits whose extension direction is parallel to the second direction. At least part of the third micro-slits do not extend from the first side edge, the second side edge, the third side edge and the fourth side edge.

In an embodiment of the disclosure, the pixel structures include a plurality of edge pixel structures adjacent to a display area edge and arranged along a first direction. The reflective pattern of each of the edge pixel structures has a first side edge and a second side edge arranged along the first direction. The micro-slits of the reflective pattern of each of the edge pixel structures include a plurality of first micro-slits extending from the first side edge. The first micro-slits are arranged at intervals along a second direction. The second direction intersects the first direction. An extension direction of the first micro-slits is parallel to the first direction. A spacing along the second direction between any two adjacent ones of the first micro-slits decreases as it approaches the display area edge.

In an embodiment of the disclosure, each of the pixel structures has an active device. The reflective patterns are electrically connected to the plurality of active devices of the plurality of pixel structures, respectively.

In an embodiment of the disclosure, each of the pixel structures has an active device and a pixel electrode electrically connected to each other. The reflective patterns respectively overlap the plurality of pixel electrodes of the plurality of pixel structures.

Based on the above, in a display panel according to an embodiment of the disclosure, a reflective pattern of a pixel structure is divided into a plurality of reflective portions connected to each other by a plurality of micro-slits. The micro-slits between the reflective portions can effectively reduce the dark-state brightness of the display panel, thereby improving its display contrast. In addition, the configuration of the micro-slits can also improve the brightness uniformity of the display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that both the foregoing and other detailed descriptions, features and advantages are intended to be described more comprehensively by providing an embodiment accompanied with figures hereinafter. Directional terms used in the following embodiments, such as upper, lower, left, right, front, and rear, merely refer to directions in the accompanying drawings. Therefore, the directional terms are used to illustrate rather than limit the disclosure.

The ordinal numbers used in the specification and claims, such as "first", "second", etc., are used to modify elements. They themselves do not imply and represent that the element (or elements) has any previous ordinal number. It does not represent the order of one element with another element, or the order of the manufacturing method. The use of these ordinal numbers is only used to clearly distinguish an element with a certain name from another element with the same name. The same words may not be used in the specification and claims. Accordingly, the first component in the specification may be the second component in the claims.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Figure 1:
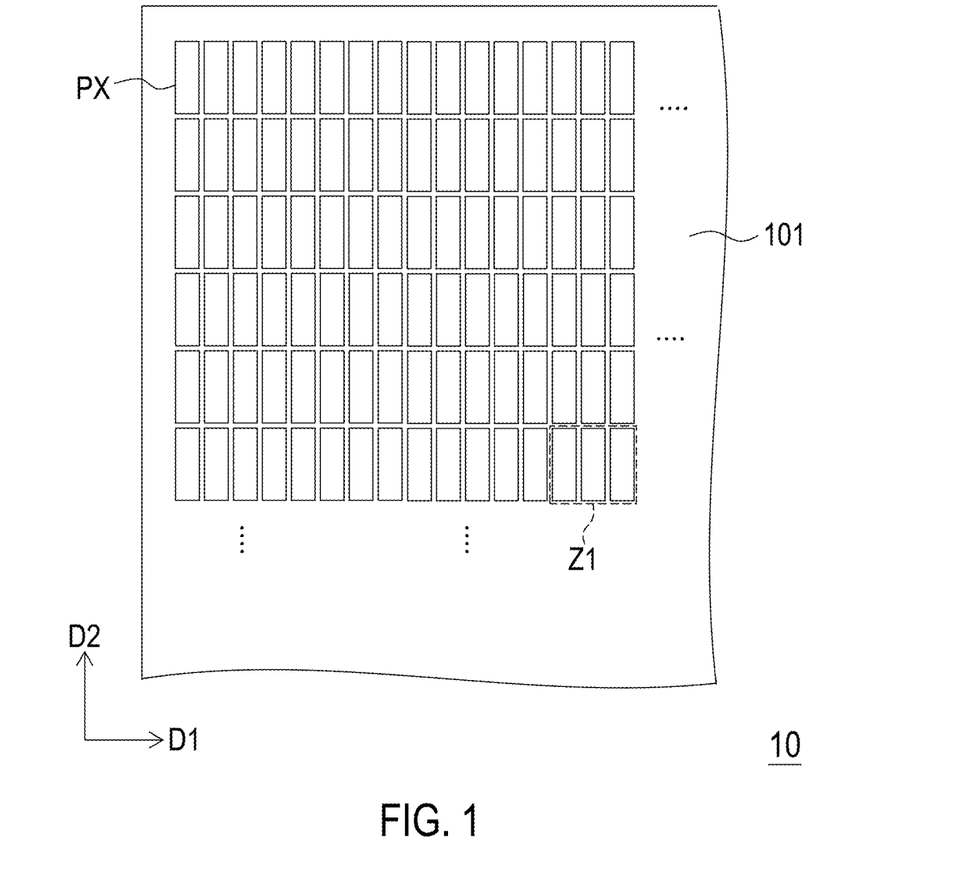
FIG. 1 is a schematic front view of a display panel according to a first embodiment of the disclosure.
Figure 2:
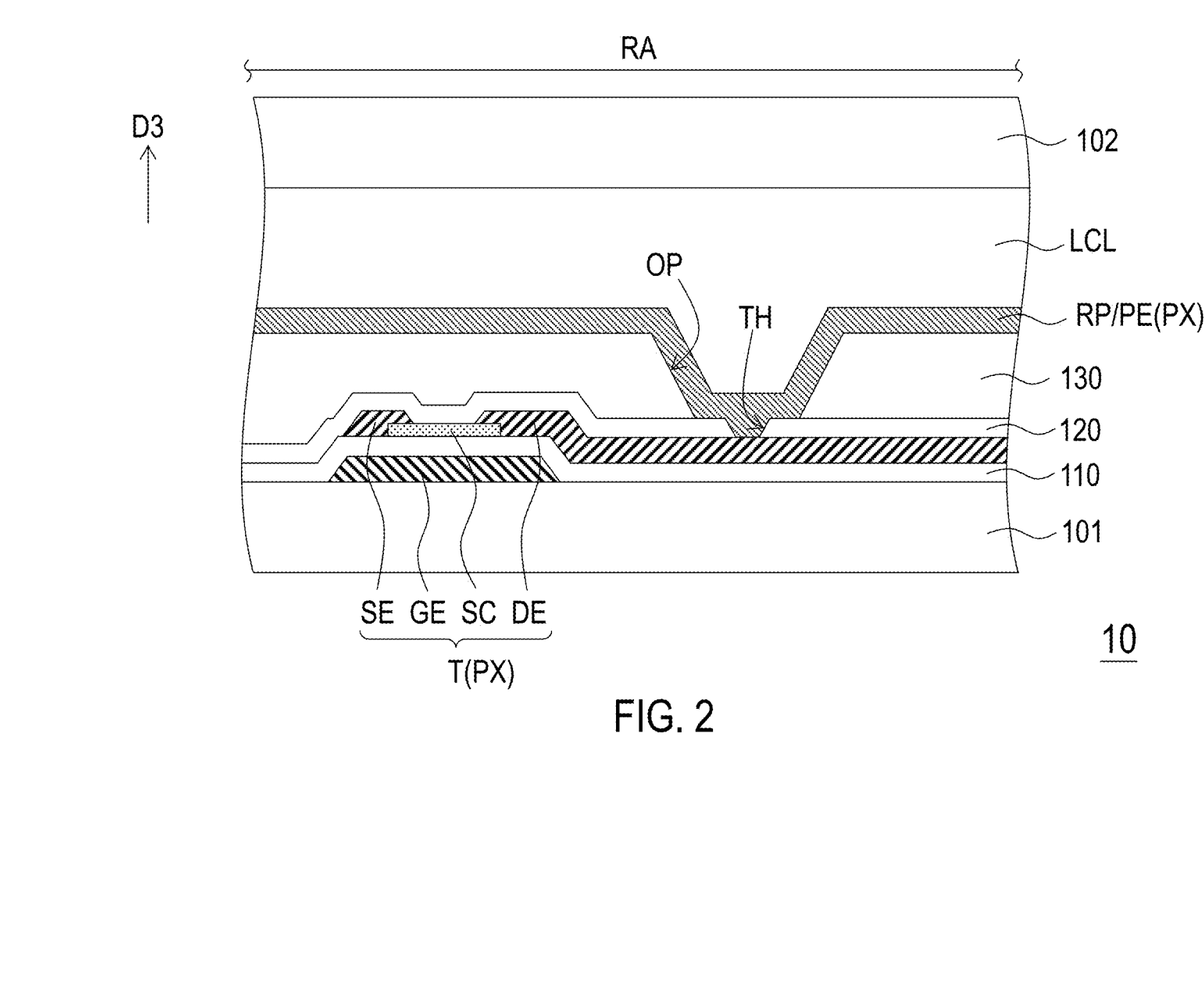
FIG. 2 is a schematic cross-sectional view of a display panel according to a first embodiment of the disclosure.
Figure 3:
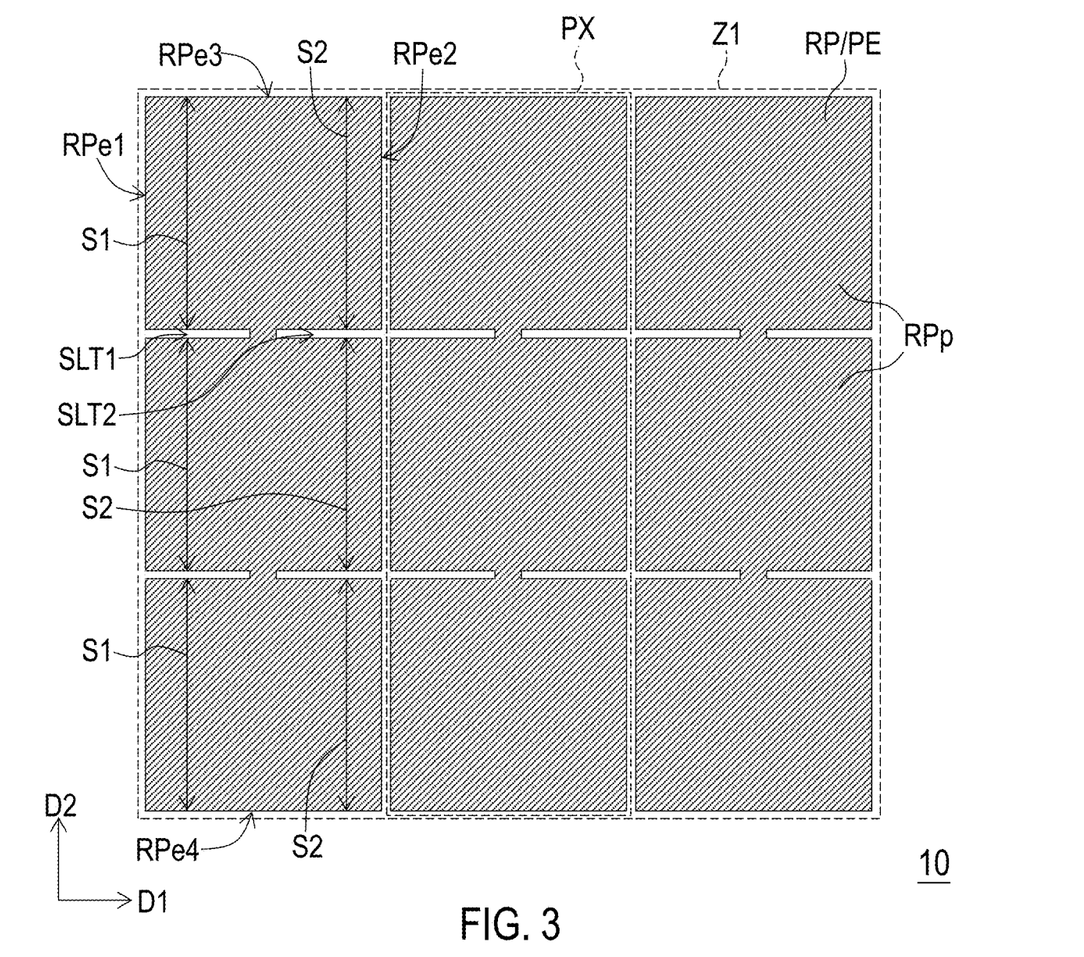
FIG. 3 is an enlarged schematic diagram of a reflective pattern of a pixel structure in FIG. 1.

FIG. 1 is a schematic front view of a display panel according to a first embodiment of the disclosure. FIG. 2 is a schematic cross-sectional view of a display panel according to a first embodiment of the disclosure. FIG. 3 is an enlarged schematic diagram of a reflective pattern of a pixel structure in FIG. 1. FIGS. 4A to 4D are schematic front views of another modified embodiments of the reflective pattern in FIG. 3. FIG. 3 corresponds to an area Z1 of FIG. 1. For clarity, FIG. 1 only shows part of film layers of FIG. 2, and FIG. 3 only shows the reflective pattern RP of FIG. 2.

Referring to FIG. 1 and FIG. 2, a display panel 10 includes a first substrate 101, a second substrate 102 and a liquid crystal layer LCL. The first substrate 101 and the second substrate 102 are overlapped, for example, along a direction D3. The liquid crystal layer LCL is provided between the first substrate 101 and the second substrate 102. It should be noted first that unless otherwise mentioned below, the overlapping relationship between two components is defined along the direction D3, and the overlapping direction will not be described again.

For example, the first substrate 101 may be provided with a plurality of scan lines (not shown), a plurality of data lines (not shown) and a plurality of pixel structures PX. The data lines may be arranged along a direction D1 and extend in a direction D2, and the scan lines may be arranged along the direction D2 and extend in the direction D1, where the direction D1 and the direction D2 intersect each other. The plurality of pixel structures PX may be arranged in multiple columns along the direction D2 and multiple rows along the direction D1 respectively. That is, the pixel structures PX may be arranged in an array on the substrate 101, and each is electrically connected to a scanning line and a data line, but the disclosure is not limited thereto.

The pixel structure PX may include an active device T and a pixel electrode PE electrically connected to each other. In the embodiment, the method of forming the active device T may include the following steps: sequentially forming a gate GE, a gate insulating layer 110, a semiconductor pattern SC, a source SE and a drain DE on the substrate 101. The semiconductor pattern SC is disposed overlapping the gate GE. The source SE and the drain DE overlap the semiconductor pattern SC and are in electrical contact with the semiconductor pattern SC. In the embodiment, the gate GE of the active device T may be selectively disposed below the semiconductor pattern SC to form a bottom-gate thin film transistor, but the disclosure is not limited thereto. In other embodiments, the gate of the active device may also be selectively disposed above the semiconductor pattern to form a top-gate thin film transistor.

Furthermore, the active device T may be covered with an insulating layer 120 and an insulating layer 130 in sequence. The insulating layer 130 has an opening OP exposing a portion of the insulating layer 120. The insulating layer 120 has a contact hole TH that overlaps the opening OP and exposes a portion of a surface of the drain DE. The pixel electrode PE is disposed on the insulating layer 130 and is electrically connected to the drain DE of the active device T through the opening OP of the insulating layer 130 and the contact hole TH of the insulating layer 120.

In the embodiment, the insulating layer 120 is, for example, a passivation layer, and the insulating layer 130 is, for example, a planarization layer. It should be noted that the gate GE, the source SE, the drain DE, the semiconductor pattern SC, the gate insulating layer 110, the passivation layer (i.e., the insulating layer 120) and the planarization layer (i.e., the insulating layer 130) may be respectively implemented by any gate, any source, any drain, any semiconductor pattern, any gate insulating layer, any passivation layer and any planarization surface used for a display panel that is well known to those skilled in the art, and the gate GE, the source SE, the drain DE, the semiconductor pattern SC, the gate insulating layer 110, the passivation layer and the planarization layer may be formed by any method that is well known to those skilled in the art. Therefore, details related to the aforementioned components will not be described here.

In the embodiment, the material of the pixel electrode PE includes, for example, metal, alloy, nitride of metal material, oxide of metal material, oxynitride of metal material, or other suitable materials, or stacked layers of metal material and other conductive materials. Specifically, in the embodiment, the pixel electrode PE may simultaneously serve as the reflective pattern RP of the pixel structure PX and defines a reflective area RA. That is, the pixel electrode PE in the embodiment may be a reflective electrode, and the display panel 10 may be a reflective liquid crystal display panel, but the disclosure is not limited thereto.

On the other hand, a plurality of filter patterns (not shown) may be provided on the second substrate 102. The filter patterns are respectively overlapped with the plurality of pixel electrodes PE of the plurality of pixel structures PX, and are capable of filtering lights. For example, each of the filter patterns is suitable for passing red light, green light or blue light, but the disclosure is not limited thereto. In addition, a common electrode layer (not shown) may also be provided on the second substrate 102. The electric field generated between the common electrode layer and the pixel electrode PE is suitable for driving a plurality of liquid crystal molecules (not shown) of the liquid crystal layer LCL to rotate to form an alignment state corresponding to the direction and intensity of the electric field. For example, in the embodiment, the liquid crystal layer LCL may be driven in a twisted-nematic (TN) mode or an electrically controlled birefringence (ECB) mode. However, the disclosure is not limited thereto. In other embodiments, the common electrode layer may also be disposed on the first substrate 101 to achieve an in-plane switching (IPS) or a fringe-field switching (FFS) liquid crystal driving mode.

Furthermore, in the embodiment, the reflective pattern RP (i.e., the pixel electrode PE) of the pixel structure PX is provided with a plurality of first micro-slits SLT1 and a plurality of second micro-slits SLT2. More specifically, the arrangement of these micro-slits can divide the reflective pattern RP into a plurality of reflective portions RPp, and the reflective portions RPp are still connected to each other, as shown in FIG. 3. When the display panel 10 is operated in a dark-state mode, light leakage due to manufacturing process factors is likely to occur at the junction of adjacent pixel structures PX. Through such a design, the reflection area of the reflective pattern RP can be reduced to a certain extent without significantly affecting the overall reflectivity, so as to reduce the dark-state brightness of the display panel 10 and thereby improving its display contrast.

In detail, the plurality of reflective patterns RP of the plurality of pixel structures PX are arranged at intervals along the direction D1 and the direction D2 respectively. Each reflective pattern RP has a first side edge RPe1 and a second side edge RPe2 arranged along the direction D1 and a third side edge RPe3 and a fourth side edge RPe4 arranged along the direction D2. The plurality of first micro-slits SLT1 extend from the first side edge RPe1 and are arranged at equal intervals (e.g., spacing S1) along the direction D2. The plurality of first micro-slits SLT1 are disposed between the third side edge RPe3 and the fourth side edge RPe4. The plurality of second micro-slits SLT2 extend from the second side edge RPe2 and are arranged at equal intervals (e.g., spacing S2) along the direction D2. The plurality of second micro-slits SLT2 are disposed between the third side edge RPe3 and the fourth side edge RPe4.

In the embodiment, an extension direction of each of the plurality of first micro-slits SLT1 and the plurality of second micro-slits SLT2 is parallel to the direction D1, and the first micro-slits SLT1 are respectively aligned with the second micro-slits SLT2 along the direction D1.

Figure 4A:
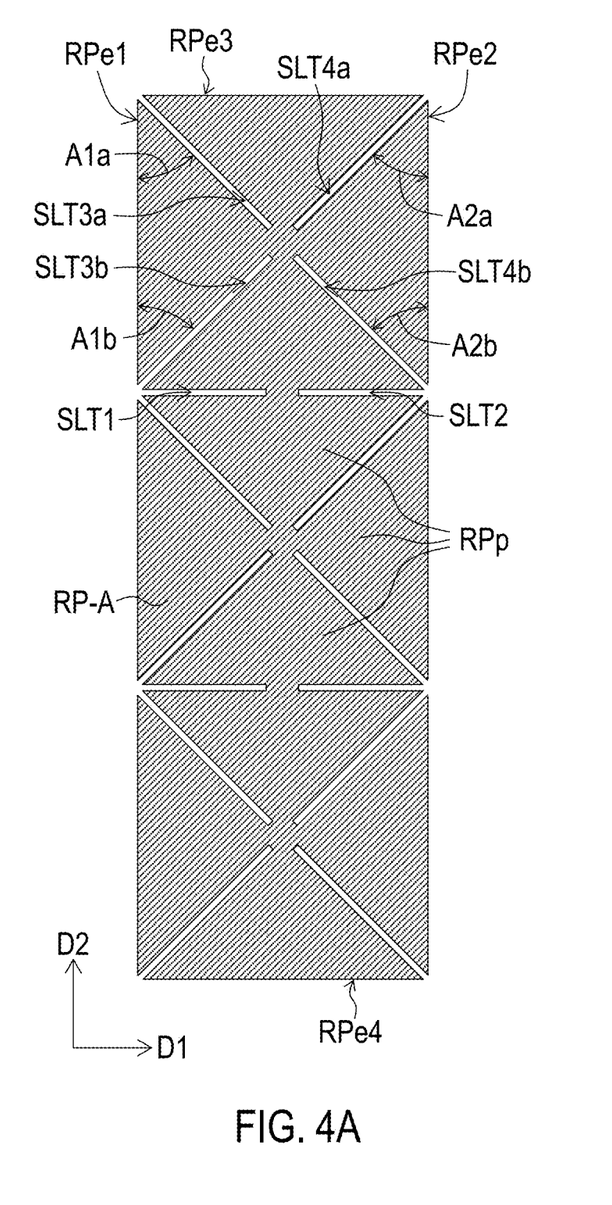
FIGS. 4A to 4D are schematic front views of another modified embodiments of the reflective pattern in FIG. 3.

Other modified embodiments of the reflective pattern RP of the embodiment will be shown below. Referring to FIG. 4A, in a modified embodiment, the reflective pattern RP-A may be further provided with a plurality of third micro-slits SLT3$a$ and a plurality of third micro-slits SLT3$b$ extending from the first side edge RPe1, and an extension direction of each of the third micro-slits slits intersects the direction D1 and the direction D2. Similarly, the reflective pattern RP-A may be further provided with a plurality of fourth micro-slits SLT4$a$ and a plurality of fourth micro-slits SLT4$b$ extending from the second side edge RPe2, and an extension direction of each of the fourth micro-slits intersects the direction D1 and the direction D2.

For example, an included angle A1$a$ or an included angle A1$b$ between the extension direction of each of the third micro-slits and the first side edge RPe1 and an included angle A2$a$ or an included angle A2$b$ between the extension direction of each of the fourth micro-slits and the second side edge RPe2 may be 45 degrees, but the disclosure is not limited thereto. It is particularly important to note that the extension direction of the third micro-slit SLT3$a$ (i.e. the first one) between any two adjacent ones of the first micro-slit SLT1, the third side edge RPe3 and the fourth side edge RPe4 intersects (for example, is perpendicular to) the extension direction of the third micro-slit SLT3$b$ (i.e. the second one). The extension direction of the fourth micro-slit SLT4$a$ (i.e. the first one) between any two adjacent ones of the second micro-slit SLT2, the third side edge RPe3 and the fourth side edge RPe4 intersects (for example, is perpendicular to) the extension direction of the fourth micro-slit SLT4$b$ (i.e. the second one).

Figure 4B:
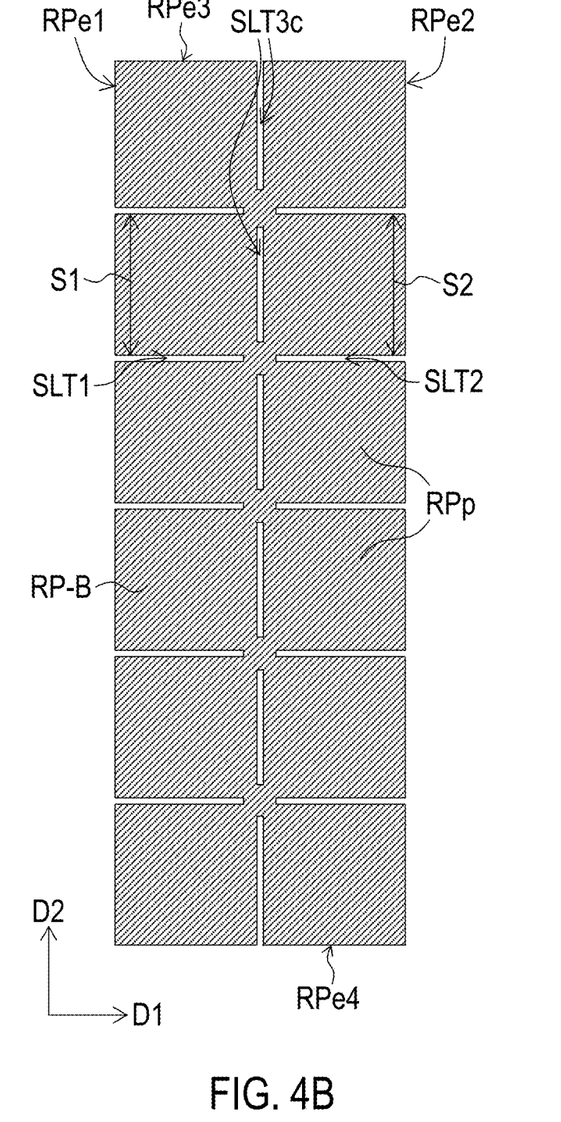

Referring to FIG. 4B, in another modified embodiment, the reflective pattern RP-B may be further provided with a plurality of third micro-slits SLT3$c$ whose extension direction is parallel to the direction D2. Among them, a part of the third micro-slits SLT3$c$ extend from the third side edge RPe3 or the fourth side edge RPe4, and another part of the third micro-slits SLT3$c$ do not extend from the first side edge RPe1, the second side edge RPe2, and the third side edge. RPe3 and the fourth lateral edge RPe4. The plurality of third micro-slits SLT3$c$ and the plurality of first micro-slits SLT1 or the plurality of second micro-slits SLT2 are alternately arranged along the direction D2.

Figure 4C:
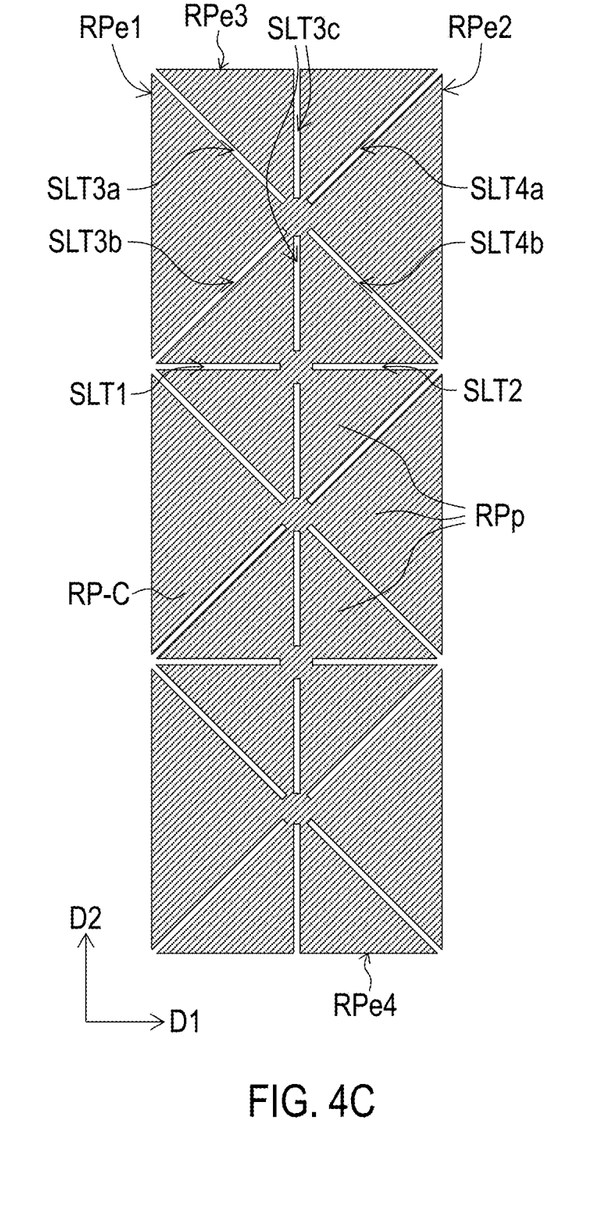

Referring to FIG. 4C, in yet another modified embodiment, in addition to being provided with the plurality of third micro-slits SLT3$a$, the plurality of third micro-slits SLT3$b$, the plurality of fourth micro-slits SLT4$a$ and the plurality of fourth micro-slits SLT4$b$ in FIG. 4A, the reflective pattern RP-C is further provided with the plurality of third micro-slits SLT3$c$ in FIG. 4B. It is particularly important to note that two third micro-slits SLT3$c$ may be provided between any two adjacent ones of the first micro-slit SLT1 (or the second micro-slit SLT2), the third side edge RPe3, and the fourth side source RPe4.

Figure 4D:
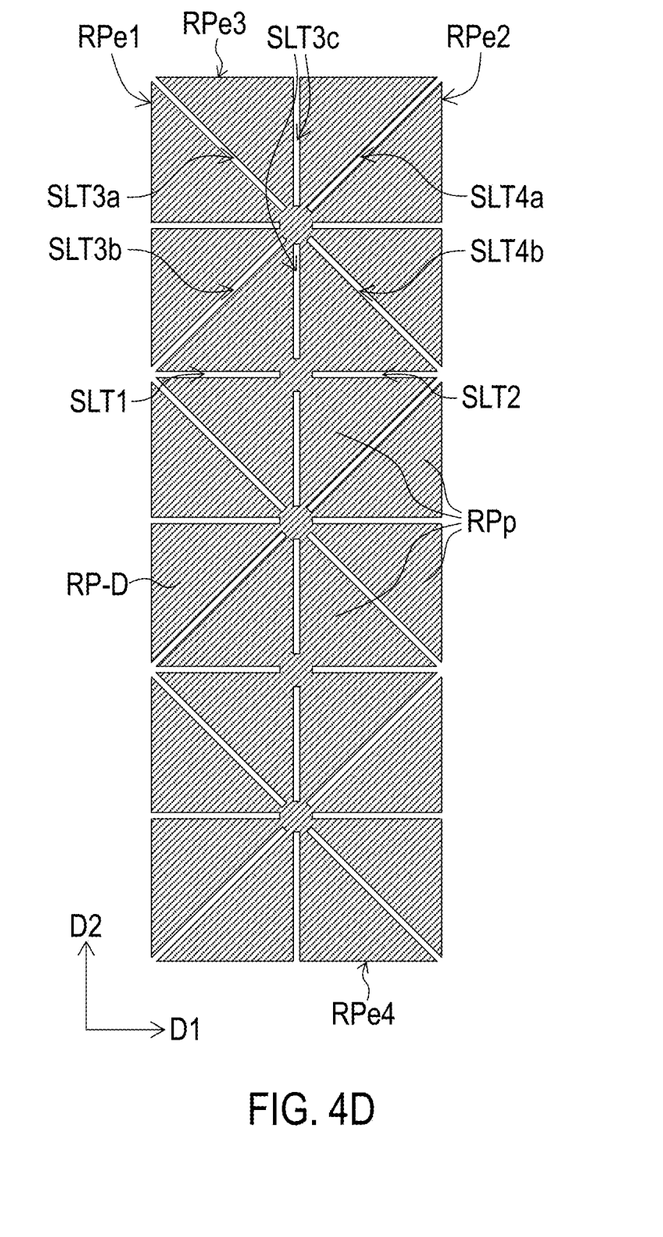

However, the disclosure is not limited thereto. As shown in FIG. 4D, in still another modified embodiment, a third micro-slit SLT3$c$ may be provided between any two adjacent ones of the first micro-slit SLT1 (or the second micro-slit SLT2), the third side edge RPe3 and the fourth side edge RPe4 of the reflective pattern RP-D. That is, the plurality of first micro-slits SLT1 (or the second micro-slits SLT2) and the plurality of third micro-slits SLT3$c$ may be alternately arranged along the direction D2. From another point of view, in the reflective pattern RP-D of FIG. 4D, the plurality of first micro-slits SLT1 and the plurality of third micro-slits SLT3a and SLT3b may be alternately arranged along the direction D2, and the plurality of second micro-slits SLT2 and the plurality of fourth micro-slits SLT4a and SLT4b may be alternately arranged along the direction D2.

Through the design of the aforementioned multiple reflective patterns, the reflection area of the reflective patterns can be reduced to a certain extent without significantly affecting the overall reflectivity, so as to reduce the dark-state brightness of the display panel and thereby improving its display contrast.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 5:
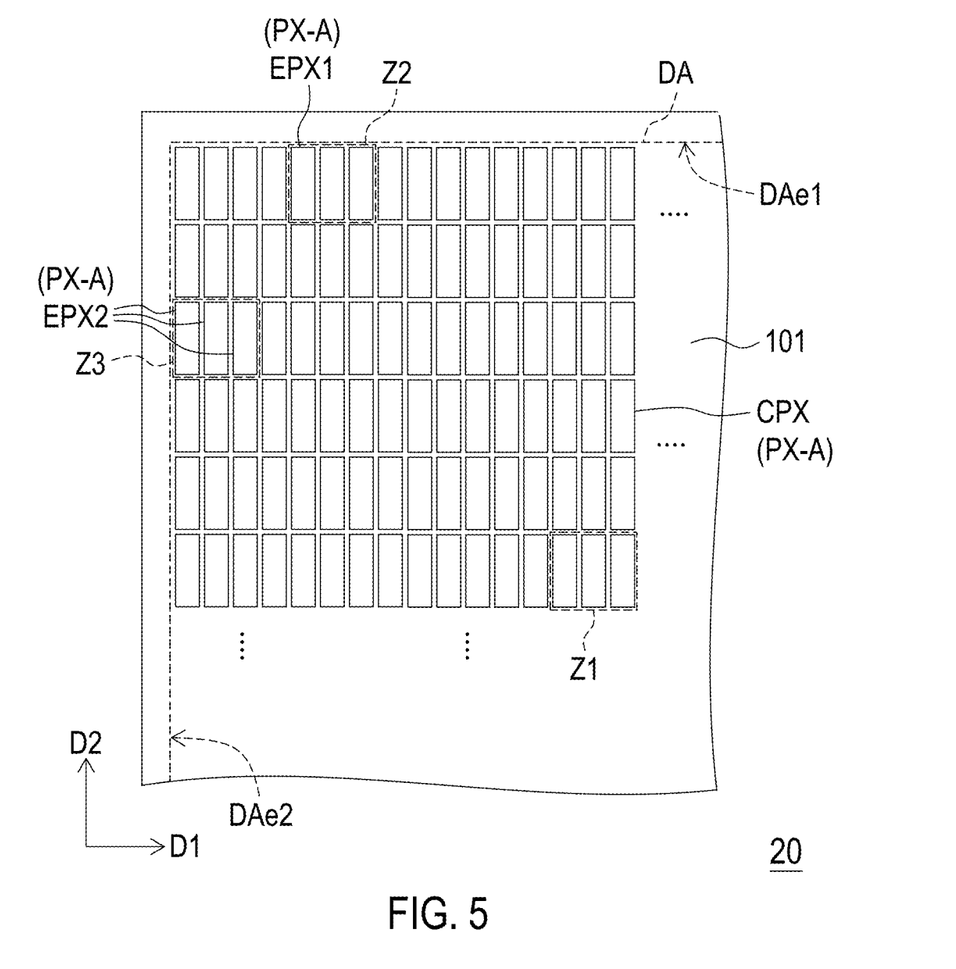
FIG. 5 is a schematic front view of a display panel according to a second embodiment of the disclosure.
Figure 6A:
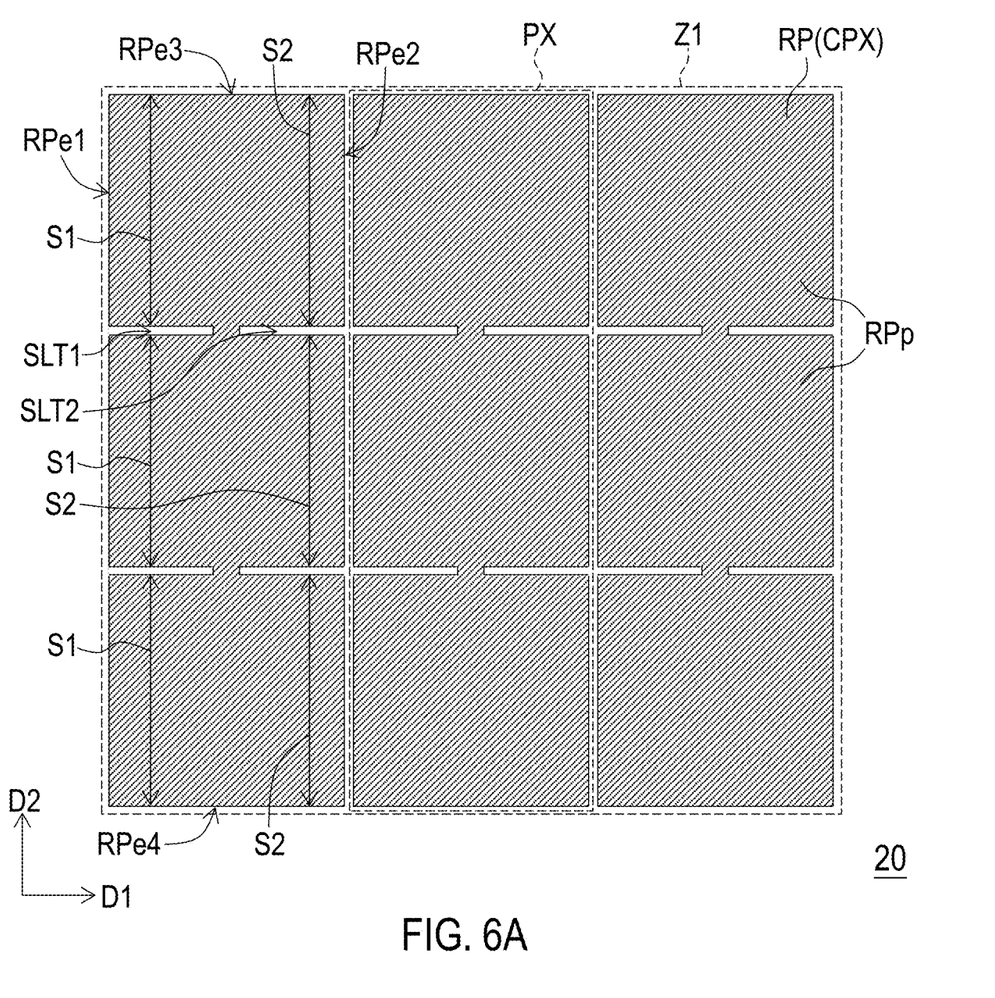
FIGS. 6A to 6C are enlarged schematic views of multiple partial areas of the display panel of FIG. 5.
Figure 6B:
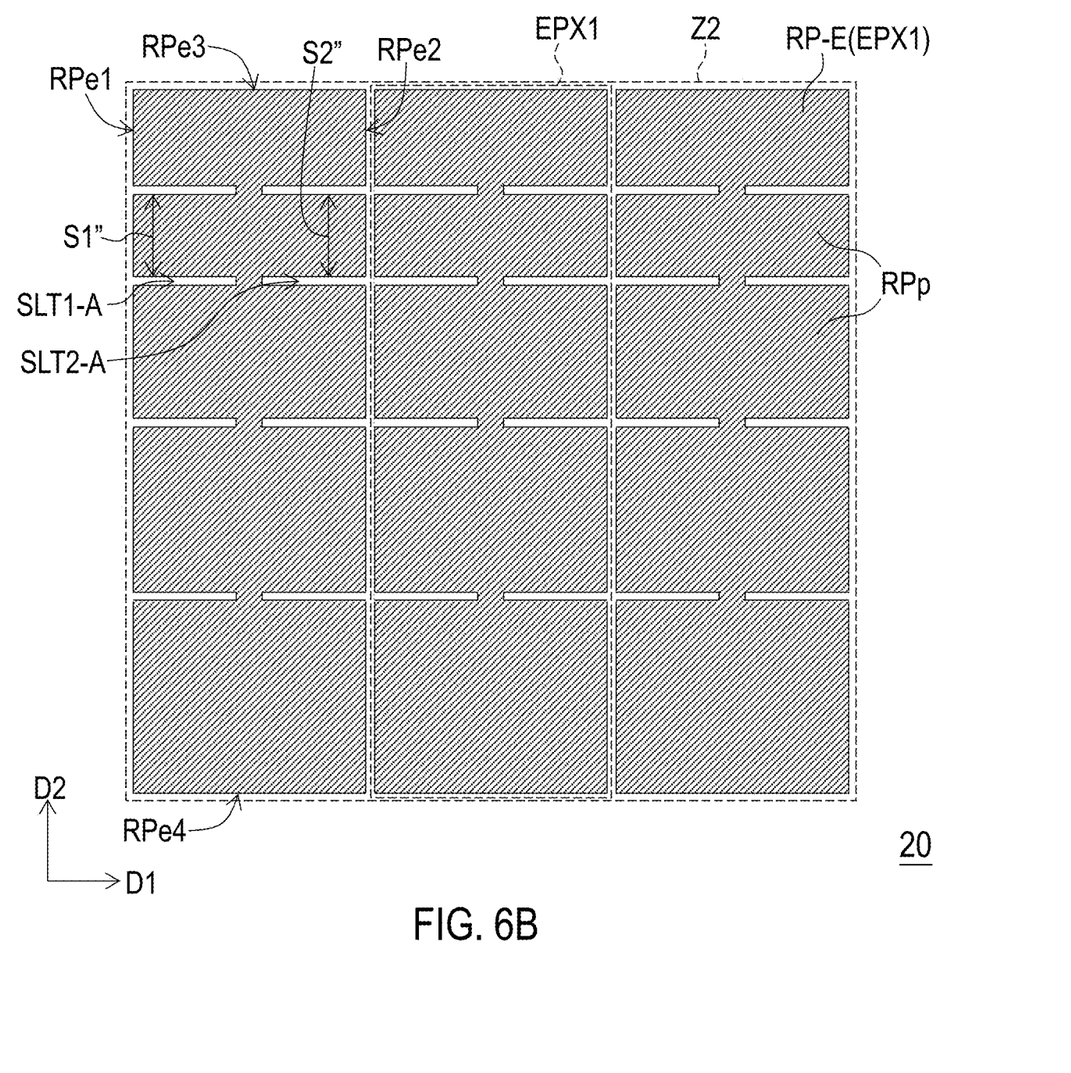
Figure 6C:
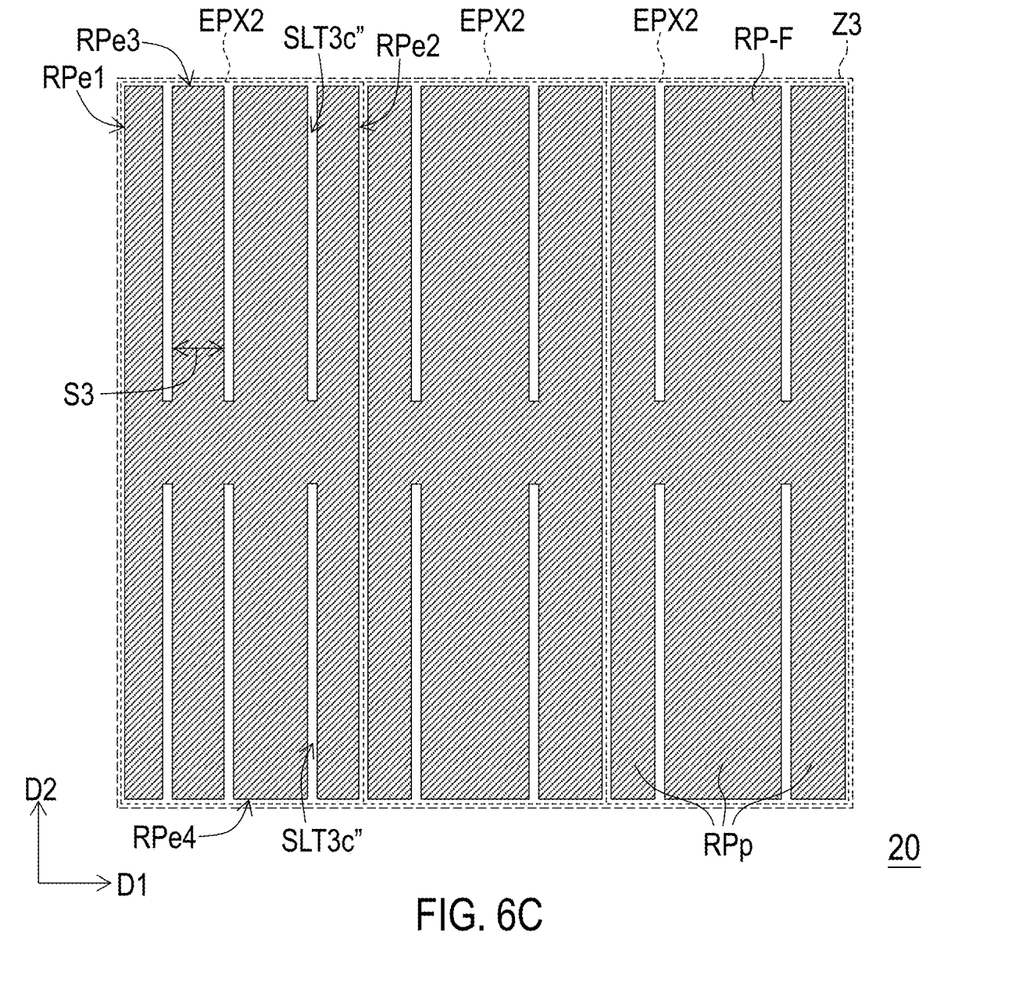

FIG. 5 is a schematic front view of a display panel according to a second embodiment of the disclosure. FIGS. 6A to 6C are enlarged schematic views of multiple partial areas of the display panel of FIG. 5. FIGS. 6A to 6C respectively correspond to an area Z1, an area Z2 and an area Z3 of FIG. 5. Referring to FIG. 5 and FIGS. 6A to 6C, compared with the display panel 10 of FIG. 1, the reflective pattern of the pixel structure PX-A of the display panel 20 of the embodiment is more diverse.

For example, in the embodiment, a display area DA provided with the plurality of pixel structures PX-A on the first substrate 101 has a display area edge DAe1 extending along the direction D1 and a display area edge DAe2 extending along the direction D2. The plurality of pixel structures PX-A include a plurality of edge pixel structures EPX1 adjacent to the display area edge DAe1 and arranged along the direction D1, a plurality of edge pixel structures EPX2 adjacent to the display area edge DAe2 and arranged along the directions D1 and D2, and a plurality of central pixel structures CPX away from the display area edge DAe1 and the display area edge DAe2. Specifically, in the embodiment, the plurality of edge pixel structures EPX2 are arranged in three pixel-structure columns along the direction D2, and these three pixel-structure columns are adjacently arranged along the direction D1. That is, these edge pixel structures EPX2 are distributed in an area adjacent to the display area edge DAe2 and whose width along the direction D1 is sufficient to provide three pixel structures PX-A.

Since the reflective pattern RP (as shown in FIG. 6A) of the central pixel structure CPX of the embodiment is similar to the reflective pattern RP of the pixel structure PX of FIG. 3, please refer to the relevant paragraphs of the foregoing embodiments for detailed description, and will not be repeated here. Only the differences between the display panel 20 of the embodiment and the display panel 10 of FIG. 1 will be described below.

Referring to FIG. 5 and FIG. 6B, the reflective pattern RP-E of the edge pixel structure EPX1 adjacent to the display area edge DAe1 may be provided with a plurality of first micro-slits SLT1-A extending from the first side edge RPe1 and a plurality of second micro-slits SLT2-A extending from the second side edge RPe2. It is particularly noted that, unlike the reflective pattern RP of the central pixel structure CPX in FIG. 6A, in the edge pixel structure EPX1, the plurality of first micro-slits SLT1-A (or the plurality of second micro-slits SLT2-A) of the reflective pattern RP-E disposed between the third side edge RPe3 and the fourth side edge RPe4 are not arranged at equal intervals along the direction D2.

More specifically, a spacing S1" between any two adjacent ones of the plurality of first micro-slits SLT1-A along the direction D2 decreases as it approaches the display area edge DAe1, while a spacing S2" between any two adjacent ones of the plurality of second micro-slits SLT2-A along the direction D2 decreases as it approaches the display area edge DAe1. Accordingly, the display brightness difference between the display area edge DAe1 and the center of the display area of the display panel 20 caused by the different light reflection angles may be reduced, thereby improving the brightness uniformity of the display panel 20.

On the other hand, referring to FIG. 5 and FIG. 6C, the reflective pattern RP-F of the edge pixel structure EPX2 adjacent to the display area edge DAe2 may be provided with a plurality of third micro-slits SLT3c" extending from the third side edge RPe3 and the fourth side edge RPe4, and these third micro-slits SLT3c" disposed between the first side edge RPe1 and the second side edge RPe2 are arranged at intervals along the direction D1. It is particularly noted that, in the edge pixel structure EPX2, the plurality of third micro-slits SLT3c" of the reflective pattern RP-F disposed between the first side edge RPe1 and the second side edge RPe2 are not arranged at equal intervals along the direction D1. More specifically, a spacing S3 between any two adjacent ones of the third micro-slits SLT3c" arranged along the direction D1 decreases as it approaches the display area edge DAe2.

Specifically, a width of each pixel structure PX-A along the direction D1 is significantly smaller than its length along the direction D2. For example, the width of the pixel structure PX-A is one-third of the length. Therefore, in order to make the width of the brightness adjustment area on the side of the display area edge DAe2 equal to the width of the brightness adjustment area on the side of the display area edge DAe1, the aforementioned unequal spacing arrangement design of the third micro-slits SLT3c" can be applied to three edge pixel structures EPX2 adjacent to display area edge DAe2 and arranged along the direction D1 (as shown in FIG. 6C). That is, a spacing S3 between any two adjacent ones of the third micro-slits SLT3c" arranged along the direction D1 in the three edge pixel structures EPX2 decreases as it approaches the display area edge DAe2. Accordingly, the display brightness difference between the display area edge DAe2 and the center of the display area of the display panel 20 caused by the different light reflection angles may be reduced, and thereby improving the brightness uniformity of the display panel 20.

Figure 7:
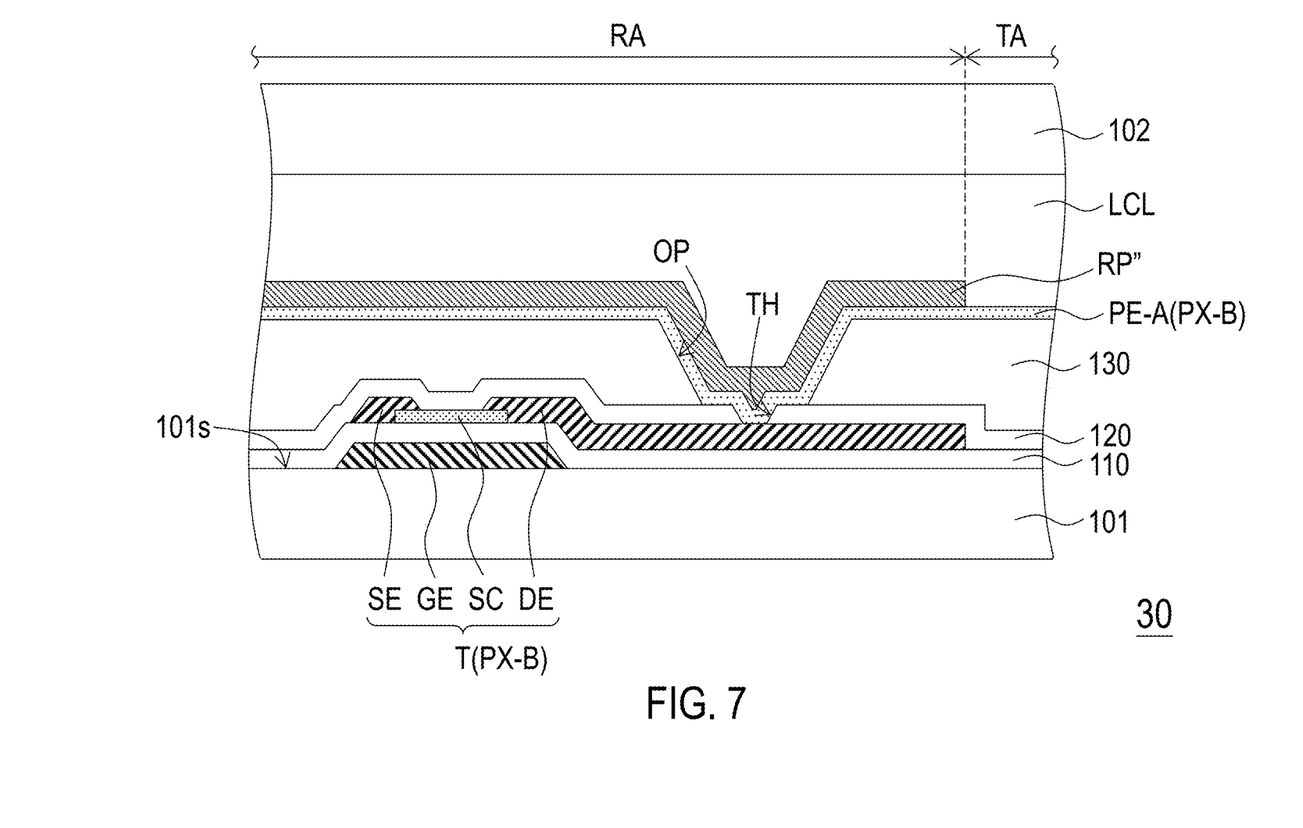
FIG. 7 is a schematic cross-sectional view of a display panel according to a third embodiment of the disclosure.

FIG. 7 is a schematic cross-sectional view of a display panel according to a third embodiment of the disclosure. Referring to FIG. 3, the only difference between the display panel 30 of the embodiment and the display panel 10 of FIG. 2 lies in: the design of the pixel structure is different. Specifically, in the display panel 30 of the embodiment, the pixel electrode PE-A of the pixel structure PX-B is a light-transmitting electrode, and the pixel structure PX-B further has an additional reflective pattern RP'''. The material of the light-transmitting electrode includes, for example, metal oxides, such as indium tin oxide, indium zinc oxide, aluminum tin oxide, aluminum zinc oxide, or other suitable oxides, or a stacked layer of at least two of the above.

In the embodiment, the reflective pattern RP''' completely overlaps the pixel electrode PE-A. That is, an orthographic projection of the reflective pattern RP''' on the substrate surface 101s of the first substrate 101 is located within an orthographic projection of the pixel electrode PE-A on the substrate surface 101s. Specifically, the reflective pattern RP" may define a reflective area RA of the pixel structure PX-B, and a part of the pixel electrode PE-A that is not covered by the reflective pattern RP" may define a light-transmitting area TA of the pixel structure PX-B. More specifically, the display panel 30 of the embodiment may be a transflective liquid crystal display panel or a micro-transflective liquid crystal display panel.

Since the micro-slit design of the reflective pattern in each of the aforementioned embodiments can be applied to the reflective pattern RP" of the embodiment, detailed description of the reflective pattern RP" can be found in the relevant paragraphs of each of the aforementioned embodiments, and will not be described again here.

To sum up, in a display panel according to an embodiment of the disclosure, a reflective pattern of a pixel structure is divided into a plurality of reflective portions connected to each other by a plurality of micro-slits. The micro-slits between the reflective portions can effectively reduce the dark-state brightness of the display panel, thereby improving its display contrast. In addition, the configuration of the micro-slits can also improve the brightness uniformity of the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel, comprising:
a first substrate and a second substrate, overlapped with each other;
a plurality of pixel structures, disposed on the first substrate, and respectively provided with a plurality of reflective patterns, wherein each of the reflective patterns is divided into a plurality of reflective portions by a plurality of micro-slits, and the reflective portions are connected to each other; and
a liquid crystal layer, disposed between the first substrate and the second substrate, wherein the pixel structures include a plurality of edge pixel structures adjacent to a display area edge and arranged along a first direction, the reflective pattern of each of the edge pixel structures has a first side edge and a second side edge arranged along the first direction,
wherein micro-slits of the reflective pattern of each of the edge pixel structures include a plurality of first micro-slits extending from the first side edge, the first micro-slits are arranged at intervals along a second direction, the second direction intersects the first direction, an extension direction of the first micro-slits is parallel to the first direction, and a spacing along the second direction between any two adjacent ones of the first micro-slits decreases as the spacing approaches the display area edge.

2. The display panel according to claim 1, wherein the reflective patterns are respectively arranged at intervals along the first direction and the second direction, each of the reflective patterns has the first side edge and the second side edge arranged along the first direction, the micro-slits include the plurality of first micro-slits whose extension direction is parallel to the first direction, and the first micro-slits extend from the first side edge.

3. The display panel according to claim 2, wherein each of the reflective patterns further has a third side edge and a fourth side edge arranged along the second direction, and the first micro-slits are arranged at intervals along the second direction and disposed between the third side edge and the fourth side edge.

4. The display panel according to claim 3, wherein the micro-slits further include a plurality of second micro-slits extending from the second side edge, an extension direction of the second micro-slits is parallel to the first direction, the second micro-slits are arranged at intervals along the second direction and disposed between the third side edge and the fourth side edge, and the second micro-slits are respectively aligned with the first micro-slits along the first direction.

5. The display panel according to claim 4, wherein the micro-slits further include a plurality of third micro-slits extending from the first side edge, and an extension direction of each of the third micro-slits intersects the first direction and the second direction.

6. The display panel according to claim 5, wherein the micro-slits further include a plurality of fourth micro-slits extending from the second side edge, and an extension direction of each of the fourth micro-slits intersects the first direction and the second direction.

7. The display panel according to claim 6, wherein an included angle between the extension direction of each of the third micro-slits and the first side edge is 45 degrees, and an included angle between the extension direction of each of the fourth micro-slits and the second side edge is 45 degrees.

8. The display panel according to claim 6, wherein a first one and a second one of the third micro-slits are provided between any two adjacent ones of the first micro-slits, the third side edge and the fourth side edge, and the extension direction of the first one of the third micro-slits intersects the extension direction of the second one of the third micro-slits.

9. The display panel according to claim 8, wherein a first one and a second one of the fourth micro-slits are provided between any two adjacent ones of the second micro-slits, the third side edge and the fourth side edge, and the extension direction of the first one of the fourth micro-slits intersects the extension direction of the second one of the fourth micro-slits.

10. The display panel according to claim 6, wherein the first micro-slits and the third micro-slits are alternately arranged along the second direction, and the second micro-slits and the fourth micro-slits are alternately arranged along the second direction.

11. The display panel according to claim 4, wherein the micro-slits further include a plurality of third micro-slits whose extension direction is parallel to the second direction, and at least part of the third micro-slits do not extend from the first side edge, the second side edge, the third side edge and the fourth side edge.

12. The display panel according to claim 1, wherein each of the pixel structures has an active device, and the reflective patterns are electrically connected to the plurality of active devices of the plurality of pixel structures, respectively.

13. The display panel according to claim 1, wherein each of the pixel structures has an active device and a pixel electrode electrically connected to each other, and the reflective patterns respectively overlap the plurality of pixel electrodes of the plurality of pixel structures.

* * * * *